(No Model.)

G. D. SELBY.
SIDE BAR WAGON.

No. 309,409. Patented Dec. 16, 1884.

WITNESSES:
John McDeemer
C. Sedgwick

INVENTOR:
G. D. Selby
BY Munn & Co
ATTORNEYS.

UNITED STATES PATENT OFFICE.

GEORGE D. SELBY, OF PORTSMOUTH, OHIO.

SIDE-BAR WAGON.

SPECIFICATION forming part of Letters Patent No. 309,409, dated December 16, 1884.

Application filed September 8, 1884. (No model.)

*To all whom it may concern:*

Be it known that I, GEORGE D. SELBY, of Portsmouth, in the county of Scioto and State of Ohio, have invented new and useful Improvements in Side-Bar-Spring Wagons or Vehicles, of which the following is a full, clear, and exact description.

This invention relates to the application of side bars and springs to wagons, carriages, and other vehicles. It will be found particularly advantageous in sewing-machine and other wagons in which lightness, for a given carrying capacity, is required, and in which springing and sagging of the side bars and couplings are to be avoided.

To these and other ends, as hereinafter explained, the invention consists in an extension of the side bars back over the rear axle of the vehicle, and combining with such extended portions of the bars a spring or springs, operating in connection with any required number of other springs between the fore and hind axles, to support the body of the vehicle and equalize the load to be carried.

Reference is to be had to the accompanying drawings, forming part of this specification, in which similar letters of reference indicate corresponding parts in both the figures.

Figure 1:
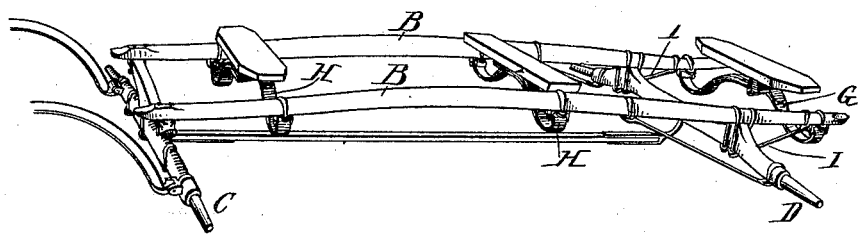
Figure 2:
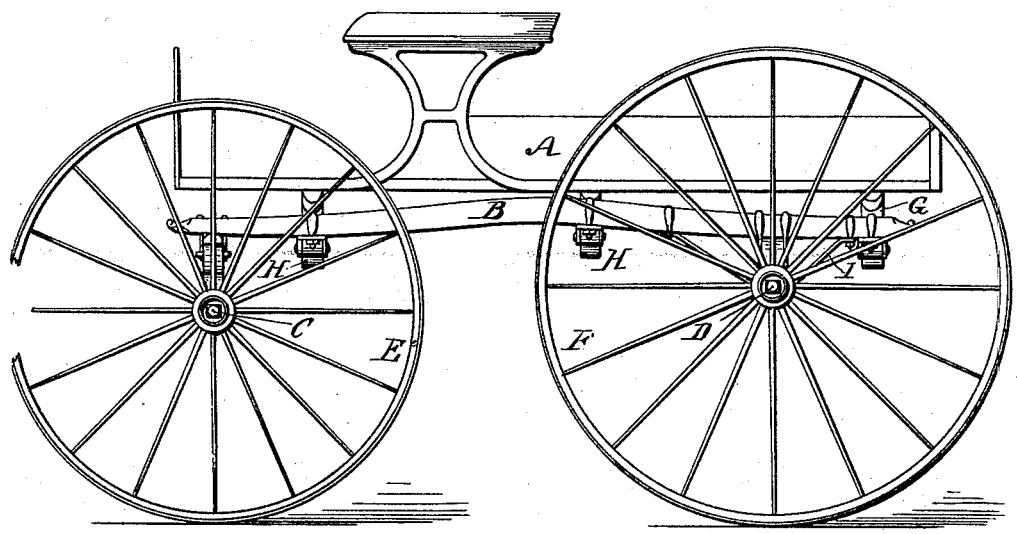

Figure 1 represents, by a view in perspective, the side bars, axles, and springs of a side-bar wagon embodying my invention; and Fig. 2 is a side elevation of the complete wagon.

A indicates the body of the wagon; B B, its side bars; C, the front axle; D, the rear axle, and E F one of each of the front and rear wheels.

Each of the side bars, B B, is constructed and arranged to extend backward over the rear axle, D, of the vehicle, and the parts so extended have attached to them a spring or springs, G, to assist in supporting the body, such spring or springs (of which there may be any number) operating in conjunction with the usual or any other suitable springs, H, between the fore and aft axles to equalize the load to be carried, the number of such springs H depending upon the length of the body required. This backward extension of the side bars and arrangement between such extended parts and the body of the wagon of an additional spring or springs admits of a very much lighter construction of the vehicle for a given carrying capacity than is otherwise practicable, and so distributes the bearings as to do away with or at least to largely reduce that springing and sagging of the side bars and couplings which is common to side-bar spring vehicles as ordinarily constructed. The backwardly-extended portions of the side bars may be supported by braces I, connected with the rear axle.

The greater lightness of the vehicle and the easier carrying of its load makes it well adapted for the transportation of sewing and other light machines. The construction also admits of the platform or body of the vehicle being hung much lower than is ordinarily the case, thus contributing to the easy loading of the wagon. Furthermore, by my improved construction the weight of the load is balanced on the side bars and several springs in a practical manner, and this is very important where a considerable length of platform or body is desirable and a much shorter coupling of the vehicle or arrangement of the fore and aft axles and their wheels apart for a long or given length of body is practicable.

The invention is not restricted to any particular kind of spring or springs.

Having thus described my invention, what I claim as new, and desire to secure by Letters Patent, is—

In side-bar-spring wagons or vehicles, the side bars constructed and arranged to extend backwardly over the rear axle of the vehicle, in combination with a spring or springs interposed between such extended portions of the side bars and the platform or body of the vehicle, and the springs arranged in advance of the rear axle or between it and the front axle, substantially as specified.

GEORGE D. SELBY.

Witnesses:
 WM. B. GRICE,
 OSCAR LONG.